United States Patent [19]
Webb et al.

[11] Patent Number: 5,367,170
[45] Date of Patent: Nov. 22, 1994

[54] METHOD FOR MEASURING SAMPLES WITH LIQUID SCINTILLATION COUNTING AND A COUNTER

[75] Inventors: Stuart Webb; Tapio Yrjönen; Tuula Stark; Timo Oikari, all of Turku, Finland

[73] Assignee: Wallac Oy, Turku, Finland

[21] Appl. No.: 973,745

[22] Filed: Nov. 9, 1992

[30] Foreign Application Priority Data

Nov. 8, 1991 [FI] Finland .................. 915285

[51] Int. Cl.⁵ .................................... G01T 1/204
[52] U.S. Cl. .................... 250/364; 250/328
[58] Field of Search ...................... 250/364, 328

[56] References Cited
U.S. PATENT DOCUMENTS 5,171,997 12/1992 Lehtinen et al. ............... 250/362

Primary Examiner—Constantine Hannaher
Attorney, Agent, or Firm—Adduci, Mastriani, Schaumberg & Schill

[57] ABSTRACT

A method and a liquid scintillation counter for measuring a sample, a mixture of the specimen to be analysed and a scintillator, in a liquid scintillation counter where the sample (14) is measured with two photo multiplier tubes (23, 24) situated on different sides of the sample. The photo multiplier tubes situated on different sides of the sample operate in coincidence. Asymmetric samples are measured in such a way that the counting efficiency is measured with the photo multiplier tubes (23, 24) operating in coincidence ad calculated using the amount of coincidence pulses, whereas the amplitude and the pulse height distribution are measured only with one photo multiplier tube (23 or 24).

8 Claims, 2 Drawing Sheets

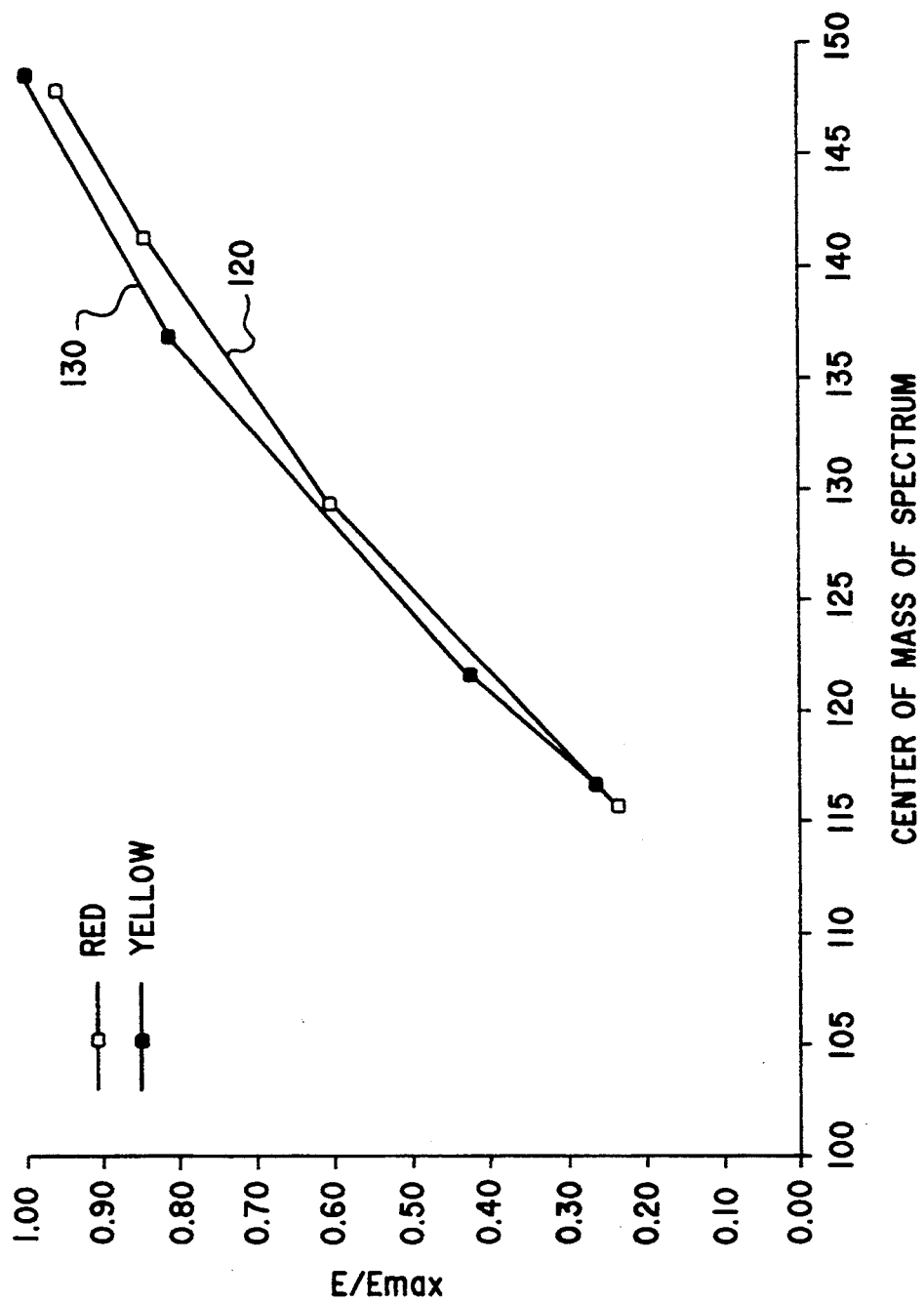

METHOD FOR MEASURING SAMPLES WITH LIQUID SCINTILLATION COUNTING AND A COUNTER

BACKGROUND OF THE INVENTION

The present invention relates to a method for measuring a sample in a liquid scintillation counter where the sample to be analysed is mixed with a liquid or a solid scintillator and is measured with two photo detectors, e.g. photo multiplier tubes or the like, the detectors working in coincidence and situated on the opposite sides of the sample.

As is well known, the liquid scintillation counting method is commonly used for measuring radioactive isotopes, e.g. tritium and carbon-14, which emit low-energy beta or corresponding particles. The range of emission of the low-energy beta particle in the sample is generally few tens of micrometers at the most. Consequently, the sample to be analysed has to be placed in direct contact with the scintillation medium, liquid or solid, either by dissolving it into scintillation molecules of the medium or attaching it to a scintillation particle using some special binding reactions. In this interaction process most of the kinetic energy of the interacting beta particle is absorbed by the medium or solvent and then transferred to the scintillator or solute that emits scintillation photons, whose amount is proportional to the energy of the interacted beta particle.

These scintillation photons are detected usually by two photo multiplier tubes, working in coincidence, that convert the photons into electric pulses. The coincidence method eliminates the thermal noise of the photo multiplier tubes. The heights of the pulses from the sample are proportional to the amount of emitted scintillation photons and thus proportional to the energy of the interacted beta particle. Normally, the pulses from both the photo multiplier tubes are summed together.

Because the energies of the emitted beta particles are distributed in a way characteristic to the beta decay of the isotope to be counted, a continuous spectrum corresponding to the energy distribution of the emitted beta particles is obtained by means of the multichannel analyser incorporated in the counter. This continuous spectrum has certain characteristic properties, e.g. total counts, number of counts in a certain "counting window" or channel range of the multichannel analyser, end point, maximum value and center of mass, i.e. the centroid of the obtained spectrum. The channel of the multichannel analyser can be calculated, in which the end point, the maximum value and the center of the mass are located, i.e. the channel co-ordinates of these values can be determined. The channel co-ordinate of the center of the mass of the sum spectrum is generally used as a measure of the quench level of the sample.

The counting efficiency of a liquid scintillation counter means the efficiency of the counting system to detect the beta particles emitted by the sample to be analysed.

When measuring sample activities with liquid scintillation counters, a basic problem is the reduction in counting efficiency due to the quenching in the sample. There are two types of quenching: chemical and color quenching. The chemical quenching is a phenomenon where the chemical impurities in the sample interfere with the reaction between the beta particle and the scintillator inhibiting the production of photons, and thus reducing the counting efficiency. Whereas, in the color quenching the impurities containing color absorb the photons of the scintillation, and thus reduce the counting efficiency.

Because the quenching reduces scintillation photons the spectrum also shits to lower channels of the multichannel analyser. Therefore, an appropriate numerical factor describing the position of the spectrum, e.g. the end point, maximum point or the center of the mass, can be used as a quenching parameter.

It is known that in liquid scintillation counting the reduction in the counting efficiency due to the quenching of the sample can be corrected by the use of a quench curve that describes the relationship between the counting efficiency and the amount of quench in the sample. The problem has been that the quench curves for chemically quenched and color quenched samples have not been exactly equal.

U.S. Pat. No. 4,700,072 describes a method where the difference in counting efficiencies in a color quenched sample compared to purely chemically quenched sample can be corrected using the fact that the color in the sample causes a change in the ratio of the pulse heights detected by the photo multiplier tubes working in coincidence. The reason for the change is that the scintillation photons travel through the colored solution of the samples longer to reach one of the photo multiplier tubes that then detects fewer photons that the other photo multiplier tube, because a portion of the photons are lost: they are absorbed into the solution during the travel to the photo multiplier tube.

The U.S. Pat. No. 5,061,853 describes a liquid scintillation counter that counts samples deposited on horizontally placed well plates. The counter measures the samples with a pair of photo multiplier tubes working in coincidence that are situated above and below the sample well plate. An example of a counter of this type is Wallac 1450 MicroBeta, manufactured by Wallac Oy, Finland. In this counter the center of the mass of the sum spectrum from a photo multiplier tube pair working in coincidence is used for determining the quench level of the sample.

Another liquid scintillation counter counting samples deposited on horizontally placed well-plates is presented in PCT Application No. 90114090.5 (EP 0 425 767 A1). This PCT application presents a liquid scintillation counter that measures samples deposited on well-plates with only a single photo multiplier tube sensing the scintillations from each sample. Instead of the coincidence method the background noise of the photo multiplier tubes is reduced by a counting system that discriminates between the pulses attributable to sample events and pulses attributable to non-sample events, such as photo multiplier tube noise, by determining whether a selected number of electrical pulses occur with a prescribed time interval.

A method where the difference in the counting efficiencies between the sample to be analysed and a sample containing purely chemical quench is determined is presented in Finnish Patent No. 86345. In this Finnish Patent the presented method calculates and corrects the difference in the counting efficiencies by measuring, before, or after, the actual liquid scintillation counting measurement, the quenching of a light pulse travelling through the sample with a photometric device placed in the liquid scintillation counter. The amount of quenching measured by the photometric device is used for correcting the quench in liquid scintillation measurement.

In the use of both of the above described methods there are some difficulties. Significant problems arise when measuring horizontally placed well-plates in a liquid scintillation counter of normal technical level with a coincidence method. There are also other sources of error besides the difference in color and chemically quenched samples, e.g. the vertical asymmetry of the sample to be counted. The vertical asymmetry in the sample is caused, e.g. when the scintillator particles with the sample to be analysed bound onto them are precipitated onto the bottom of the sample well.

SUMMARY OF THE INVENTION

The object of this invention is to produce a novel method to overcome the problems described above and which is different from the conventional methods using the conventional technical level. The purpose of this invention is to produce a novel method to be used in a liquid scintillation counter that measures samples on a horizontally placed well-plate using the coincidence counting.

The invention is characterized in that the amount of scintillation pulses of the asymmetric sample is measured in a liquid scintillation counter using two photo detectors working in coincidence and the amplitude and the pulse height distribution of the scintillation pulses is defined with only one photo detector.

Thus, the invention describes a method that defines the counting efficiency for asymmetric samples using the amount of coincidence pulses, whereas the quench level of the sample is defined using only the pulse spectrum collected in the upper (or lower) photo multiplier tube. The conventional technique is that the quench level of the sample is defined using the sum spectrum of the two multiplier tubes.

Here, as also later in the next description of the invention, the sample means a mixture of the specimen to be analysed and the scintillator, liquid or solid, the sample deposited in a sample well or the like.

The purpose of the invention is also to present a new liquid scintillation counter for measuring a sample, a mixture of the specimen to be analysed and the liquid or solid scintillator, using two photo detectors, e.g. photo multiplier tubes, situated on the opposite sides of the samples and operating in coincidence. Such a liquid scintillation counter is characterized in that the photo multiplier tubes situated on the opposite sides of the sample measure in coincidence counting the amount of the scintillation pulses and that only one of the photo detectors measures the amplitude of the pulses.

Other characteristics of the invention are presented later in the patent claims.

BRIEF DESCRIPTION OF THE DRAWINGS

The invention is described in the following examples referring to the enclosed drawings, where

FIG. 3 is similar to FIG. 2, but illustrates a coincidence counting method described in this invention, where the curves are: the counting efficiencies as a function of the center of mass of the spectrum measured only in the upper photo multiplier tube.

FIG. 1 shows a sectional view of the liquid scintillation counter with a sample vessel 10. The sample vessel 10 contains the sample 14, which is a mixture of the specimen to be analysed and the scintillation medium, liquid or solid. The photo multiplier tubes 23 and 24 that are situated below and above the sample vessel 10 measure the scintillation pulses emitted form the sample 14.

DESCRIPTION OF THE PREFERRED EMBODIMENTS

Figure 1:
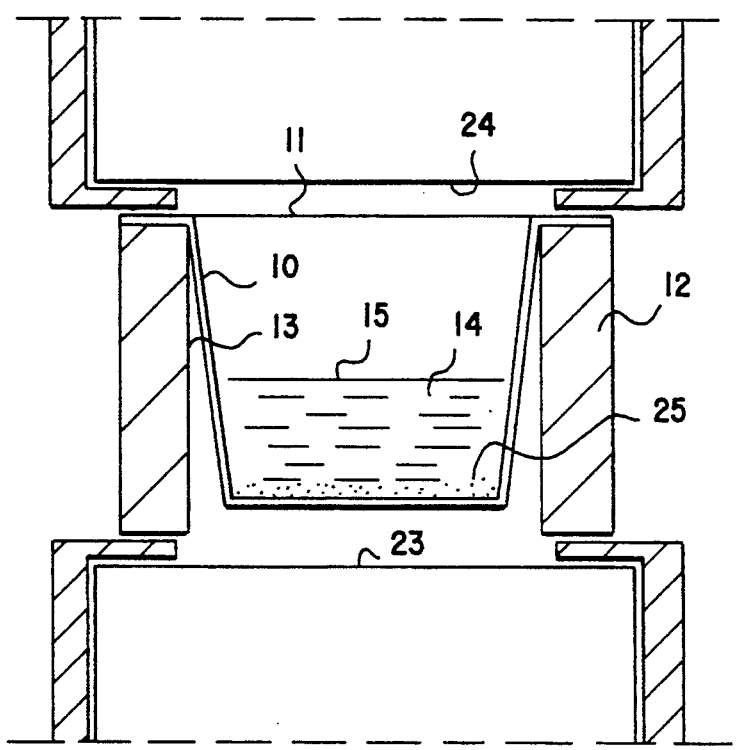
FIG. 1 shows a front sectional view of the counting chamber of the liquid scintillation counter with an asymmetric sample between the photo multiplier tubes.

In the conventional liquid scintillation counting method the scintillation pulses emitted from the sample 14 are measured by both photo multiplier tubes 23 and 24 that operate in coincidence and the pulses are summed up. However, if the sample 14 is vertically asymmetric the pulses reaching the upper and lower photo multiplier tubes are not equal. The sample 14 in FIG. 1 is vertically asymmetric because there is precipitation 25 on the bottom of the sample vessel 10.

According to this invention only the amount of scintillation pulses from the sample 14 is measured using both lower and upper photo multiplier tubes 23 and 24 that are operating in coincidence. The amplitude and the pulse height distribution of the scintillation pulses is defined using only a single photo detector, e.g. in FIG. 1 the upper photo multiplier tube 24.

Figure 2:
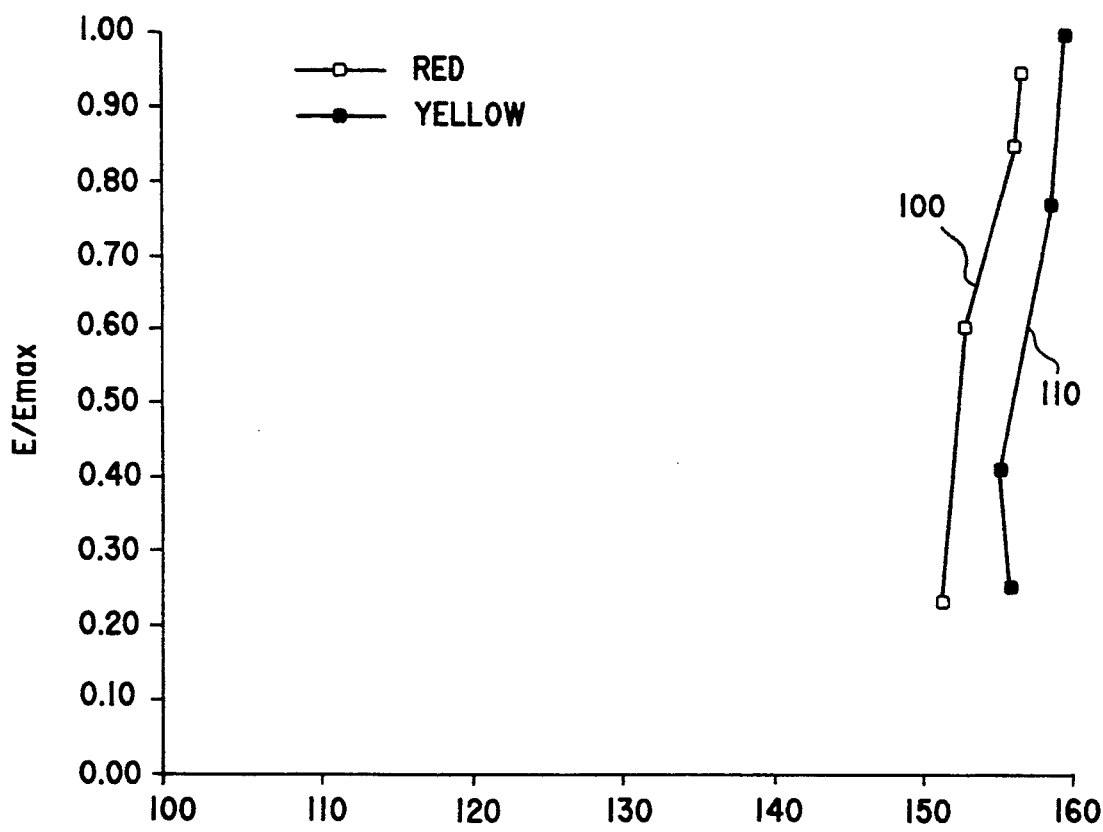
FIG. 2 shows the counting efficiency as a function of the center of mass of the coincidence sum spectrum of both the upper and lower photo multiplier tubes when measuring two vertically asymmetric, colored samples, yellow and red, using the conventional, coincidence counting method.

FIG. 2 shows an example of result curves of a measurement where the vertically asymmetric samples quenched with yellow or red color are counted using the conventional coincidence method, when the result curve is the counting efficiency as a function of the center of mass of the sum spectrum of both the upper and lower photo multiplier tubes. The number 100 in FIG. 2 shows a result curve of the samples quenched with a red color, and the number 110 shows the result curve of the samples quenched with a yellow color.

In this example the samples of the curves 10 and 11 are prepared on a well-plate, made of polystyrene, whose wells are flat-bottomed with a volume of 400 microliters. The result curves 100 and 110 do not overlap and they are very steep. Therefore, when using vertically asymmetric samples quenched with a red color in standardization and then using the result curve 100 to calculate the counting efficiencies of vertically asymmetric samples quenched with a yellow color, the results would be erroneous. Due to the steepness of the curve 100, the calculation of counting efficiencies even for vertically asymmetric samples quenched with a red color could be difficult, due to the fact that even the smallest error in measuring the quench level of the sample could cause a big error in the counting efficiency read from the curve.

FIG. 3 shows result curves corresponding to the curves in FIG. 2 when using the coincidence counting method described in this invention. The curves in FIG. 3 show the counting efficiencies as a function of the center of mass of the pulse spectrum measured in the upper photo multiplier tube. The result curve of the vertically asymmetric samples quenched with a red color is marked with number 120 and the curve for yellow samples is marked with number 130.

The result curves 120 and 130 correspond to each other much better than the curves 100 and 110 in FIG.

2. Moreover, the curves 120 and 130 are much shallower than the corresponding curves 100 and 110 in FIG. 2. Consequently, the standard curve measured using vertically asymmetric samples quenched with a red color would give significantly more accurate results for vertically asymmetric samples quenched with a yellow color than the curve 100 in FIG. 2.

The method and the device presented in this invention are not confined to the above presented example, but the invention contains all the measuring methods of a liquid scintillation counter measuring well-plates with a coincidence method and uses, instead of the sum spectrum of the upper and lower tubes, a spectrum of a single photo multiplier tube to define the measure of the quench level of the sample. As an example, if there is a piece of a filter on top of the sample liquid, then the right measurement result is received by measuring the amplitude and the pulse height distribution of the scintillation pulses using only the lower photo multiplier tube.

Also those counting methods where the sample is in a solid state are included within the scope of the invention. A solid sample can also be asymmetric, which is measured according to the method described in this patent. Also, the samples can be placed in any position and the photo detectors can be situated in any direction. It should be obvious for an expert that the different applications of this invention can vary according to the following patent claims.

We claim:

1. In a method for measuring a sample in a liquid scintillation counter, where an asymmetric sample comprised of a mixture of a specimen to be analysed and a liquid or a solid scintillator is measured using upper and lower photodetectors situated on opposite sides of the sample and operating in coincidence, the improvement comprising the steps of:

determining the amount of counted coincident scintillation pulses using both of the upper and lower photodetectors;

determining the amplitude and the pulse height distribution of the scintillation pulses using only one of the photodetectors;

determining counting efficiency using the amount of coincidence pulses counted with the lower and upper photodetectors; and determining quench level of the sample using either one of the lower and the upper photodetector.

2. A method as claimed in claim 1 characterized in that the pulse amplitude of the sample is determined using only the upper photodetector.

3. A method as claimed in claim 1 characterized in that the pulse amplitude of the sample is determined using only the lower photodetector.

4. In a liquid scintillation counter for measuring an asymmetric sample comprised of a mixture of the specimen to be analysed and a liquid or solid scintillator using upper and lower photodetectors situated on opposite sides of the sample and operating in coincidence, the improvement wherein both the upper and lower photodetectors are arranged to measure the amount of scintillation pulses and only one of the photodetectors is arranged to measure the amplitudes of the pulses, both the upper and lower photodetectors being arranged to measure counting efficiency, and only one of the upper and lower photodetectors measuring quench level of the sample.

5. A liquid scintillation counter as claimed in claim 4 characterized in that the photodetector above the asymmetric sample is arranged to measure the pulse height distribution.

6. A liquid scintillation counter as claimed in claim 4 is characterized in that the photodetector below the asymmetric sample is arranged to measure the pulse height distribution.

7. A liquid scintillation counter as claimed in claim 4 characterized in that the two photodetectors operating in coincidence are situated above and below a horizontally placed well-plate having sample wells containing vertically asymmetric samples, and both photodetectors are arranged to measure the amount of emitted scintillation pulses and the photodetectors above the sample is arranged to measure only the pulse height distribution.

8. A liquid scintillation counter as claimed in claim 4 characterized in that in the liquid scintillation counter the liquid sample placed in a sample well is vertically asymmetric such that there is precipitation on the bottom of the sample well and the photodetectors situated above and below the sample are arranged to measure in coincidence only the amount of scintillation pulses emitted from the sample and the photomultiplier tube situated above the sample is arranged to measure the pulse height distribution.

* * * * *